United States Patent Office 3,562,309
Patented Feb. 9, 1971

3,562,309
NITROFORM SALT OF CERTAIN METALS
John R. Lovett, Edison, N.J., assignor to Esso Research and Engineering Company, a corporation of Delaware
No Drawing. Filed Nov. 30, 1960, Ser. No. 72,799
Int. Cl. C07f 5/02, 5/06
U.S. Cl. 260—448                    14 Claims The present invention relates to light metal salts of nitroform, novel compounds, and the preparation thereof, for use in rocket propellants.

Light metal salts of nitroform are desirable components in solid fueled rockets due to their high oxygen content. A few such light metal salts are known, e.g., the potassium salt and sodium salt. However, the more resirable salts of the lower combining weight metals, e.g. Li, Al, Be, Mg, and B, which have atomic numbers of 3 to 13, were not made hitherto. These more desirable salts of nitroform contain a metallic constituent having a combining weight in the range of 3 to 13, the combining weight of the metal constituent being its atomic weight divided by its valence.

The established procedure used prior to the present invention for preparing the potassium salt of nitroform involves neutralization of nitroform with KOH in an aqueous solution or reduction of tetranitromethane with aqueous KOH in glycerol. In such procedures, the water-insoluble potassium salt precipitates out of solution and can be filtered off.

The procedure involving an aqueous solution does not work properly or conveniently for the preparation of the desired nitroform salts of low molecular weight metals having lower combining weights than sodium and potassium. The oxides of the lower combining weight metals are less soluble in water than the corresponding metal salt of nitroform, which is the product to be recovered. This unfavorable behavior in an aqueous reaction mixture is particularly noticeable when attempts are made to prepare the lithium salt. Attempts to prepare the lithium salt of nitroform by the procedure involving an aqueous reaction mixture resulted in the formation of inseparable mixtures of lithium hydroxide and lithium salt of nitroform. Also, the extremely hygroscopic nature of the lithium salt prevents complete removal of water from the product.

The process of the present invention comprises reaction of an organo-metallic compound with nitroform or a halotrinitromethane in an inert diluent to yield the desired metal salt of nitroform.

The organo-metallic compounds are typified by compounds having one or more organo groups attached to the metal atom, depending on the valence of the metal constituent. The organo groups are usually alkyl groups, phenyl groups or alkyl-phenyl groups. In general, the more readily available organo-metallic compounds are suitable as reactants. The organo groups may be radicals derived from various other organic compounds including open chain, saturated or unsaturated, and cyclic compounds, provided they do not interfere with the formation of the desired nitroform salts. Preferably, the organo groups are alkyl, phenyl, alkyl-aryl, naphthyl, or cyclo-alkyl groups containing one or more carbon atoms. The usually available suitable orano metallic compounds contain 1–6 carbon atoms in each hydrocarbon radical. For convenience, the organo metallic compounds are alkyl metals. The nitro-containing reactant is represented for simplicity as containing a trinitromethyl radical, e.g., in the following formula:

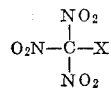

where X may be H, Br, Cl, I, $SO_4$ or other anion species capable of reacting with the organo-metallic compound. The more conveniently used reactants are the trinitromethyl compounds in which hydrogen is present as in the formula $CH(NO_2)_3$, and the corresponding bromo-trinitromethane or bromonitroform, $C(NO_2)_3Br$. However, nitroform may be in the iso- condition, thus having the formula $(NO_2)_2C:NO\ OH$, and the light metal salts may be considered as derived therefrom.

A water-free inert diluent is used as the reaction medium for effecting the reaction of the organo metallic compound with the nitroform compound under ambient conditions, e.g., at temperatures in the range of about −78° to 50° C. and under substantially atmospheric pressure. These conditions may be varied somewhat but with precautions to prevent undesired decomposition of the reactants or products. Low temperatures are preferred because reduction of the nitro compound by the metal alkyl can take place at high temperatures. The reaction commences immediately upon mixing the reactants. The proportions of the reactants used may be stoichiometric or with an excess of the nitro compound. The reaction mixture may be agitated or stirred during the reaction and subsequently the mixture containing the precipitated product may be separated, as by filtration, to recover the desired product.

The inert diluent or reaction medium is a liquid which does not react with the reactants or desired products. Accordingly, it is important to use a dry or water-free inert diluent. The inert diluent serves to bring about suitable contact between the nitroform reactant and the organo-metallic compound and aids in the separation of the solid metal salt of nitroform that is precipitated. In general, the suitable inert diluents are non-polar organic liquids, such as low boiling liquid paraffins, symmetrical ethers, naphthenic hydrocarbons, aromatic hydrocarbons, and the like. Carbon tetrachloride and similar liquid, inert liquids that are dry may be used. A convenient inert diluent for use is a liquid which holds the reactants in solution and permits precipitation of the solid nitroform salt. On the other hand, a liquid diluent may be used which dissolves the nitroform salt and permits recrystallization of the salt, if the diluent does not react with the reactants or products.

The examples which follow illustrate the method of preparation and the salt products contained that are intended to limit the scope of this invention.

EXAMPLE I 0.08 cc. butyl lithium (2.3 M) solution in pentane was added dropwise to a solution of 0.305 g. (0.002 mol) of nitroform in 25 cc. of heptane (dry). A precipitate immediately formed which was filtered and washed with dry carbon tetrachloride. The tan solid thus obatined was vacuum dried to give 0.21 g. of the lithium salt of nitroform, $LiC(NO_2)_3$. Purity of the salt was estimated to be above 90% by ultraviolet and elemental analysis.

EXAMPLE II

In the alternative use of bromotrinitromethane, $$BrC(NO_2)_3$$

in place of nitrfoorm, $HC(NO_2)_3$, 0.0025 mol (1.1 cc. of 2.3 M), butyl lithium in 10 cc. of dry pentane was reacted with 0.0025 mol (0.58 g.) bromotrinitromethane in 15 cc. of dry pentane to form lithium salt of nitroform, then recovered as in Example I.

EXAMPLE III

The detailed procedure described in Example I was repeated except that aluminum triethyl was substituted for butyl lithium. There was obtained a solid material analyzing for Al(Et₂)C(NO₂)₃.

EXAMPLE IV

Aluminum alkyl salt of nitroform was prepared by adding (0.01 mol) 0.11 g. of aluminum triethyl in 10 ml. of dry pentane to a solution of (0.03 mol) 0.69 g. of BrC(NO₂)₃ in 20 ml. of dry pentane, and recovering the solid precipitate.

EXAMPLE V

Repeat of Example III except B(tripentyl)₃ was used. Again the solid obtained indicated B(C₅H₁₁)₂C(NO₂)₃.

In selecting the organo-metallic reactant, a choice may be made of the compound which yields the nitroform salt but which leaves suitable alkyl groups in the salt for supplying fuel carbon to balance the oxidizing potentiality of the nitro groups thus providing a solid material which is of the mono-propellant type. An illustration of this kind of product is dimethyl aluminum nitroform. The alkyl metal salts of nitroform obtained as a product in one stage may be made to react with more of the nitroform reactant so as to further replace the hydrocarbon groups. The light metal salts of nitroform are of particular interest as solid oxidizers and it has been shown that these substances have many desirable characteristics. The solid lithium salt of nitroform is superior to ammonium perchlorate.

In like manner, as described in the foregoing examples, beryllium dialkyls and magnesium dialkyls are reacted with the compounds of nitroform, the alkyl group being C₁ to C₅ and preferably methyl to make a series of nitroform salts, such as beryllium salt of nitroform, beryllium methyl salt of nitroform, beryllium ethyl salt of nitroform and corresponding compounds of magnesium, e.g.

[MgC(NO₂)₃]₂ and Mg·CH₃·C(NO₂)₃.

In general, the metal salts of nitroform compounds of interest can be expressed by the general formula:

MRy[C(NO₂)₃]x wherein M is a symbol representing that of a light metal of valence 1 to 3, and R is an alkyl group which may be present 0 to 2 times so that the sum of the subscripts $x$ and $y$ is equal to the valence of M, $x$ being 1 to 3, and $y$ being 0 to 2. Thus monovalent Li as metal, M, of atomic number 3, has a combining weight which is the same as its atomic weight and combines only with a single —C(NO₃)₂ group. Divalent magnesium of atomic number 12 has a combining weight of between 12 and 13, and can combine with one alkyl group and a —C(NO₃)₂ group. Trivalent aluminum has an atomic number of 13 and in the aluminum dialkyl nitroform salts, y=2.

The solid metal salts of nitroform prepared in accordance with the described method are useful as monopropellants and as oxidizers with binders and other solid fuels in which an oxygen-containing oxidizer is needed. They may be mixed with suitable amounts of binder, e.g. organic elastomers, polmyers and with metal fuels such as aluminum, magnesium, beryllium, lithium and boron. Other oxidizers may also be present to balance the requirements for oxidation of carbon and hydrogen present in the propellant system. The metal salts of nitroform may be used singly or in mixtures in making up a propellant system which is to be used in a rocket motor.

As an example of how the light metal salts of nitroform are useful, a composite of 35 wt. percent LiC(NO₂)₃ mixed with 6.3 wt. percent boron powder and 63.2 wt. percent of an NF₂-containing polymer binder (CHNF₂)ₙ, has a determined specific impulse (Isp) of 280/second.

Al(CH₃)₂C(NO₂)₃ has a determined Isp of 287.5 as a mono-propellant.

Similarly, the nitroform salts of the other light metals B, Mg and Be can be used as monopropellants and in composits to which they supply high potential chemical energy.

Various modifications may be made which come within the scope of this invention described and claimed.

What is claimed is:
1. A nitroform salt of a metal selected from the group consisting of lithium, beryllium, boron, magnesium and aluminum.
2. Nitroform salt of beryllium.
3. Nitroform salt of magnesium.
4. Nitroform salt of lithium.
5. Alkyl aluminum salt of nitroform.
6. Alkyl boron salt of nitroform.
7. Process for preparing a light nitroform salt of a metal selected from the group consisting of lithium, beryllium, boron, magnesium and aluminum, which comprises reacting an organo-metallic compound of the metal with a nitroform reactant having the formula:

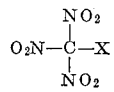

wherein X represents atomic constituents selected from the group consisting of hydrogen, bromine, chlorine, iodine, and sulfate, the organo radical in the organometallic compound of the metal being selected from the group consisting of alkyl, phenyl, alkyl-aryl, naphthyl and cyclo-alkyl hydrocarbon radicals, and recovering a resulting nitroform salt of the metal.

8. The process as defined in claim 7, in which the organo-metallic compound is reacted with a nitroform reactant in a water-free inert diluent.

9. Process for preparing a nitroform salt of a metal selected from the group consisting of lithium, beryllium, boron, magnesium and aluminum, which comprises reacting an organo-metallic compound of the metal in which the organo radical is an alkyl radical with nitroform, HC(NO₂)₃, in an inert diluent and recovering a precipitate of the resulting nitroform salt of the metal.

10. The process for preparing a lithium salt of nitroform, which comprises reacting an alkyl lithium with nitroform, HC(NO₂)₃, dissolved in a liquid hydrocarbon paraffin as inert diluent, and separating a resulting precipitate of the lithium salt of nitroform.

11. The process of claim 10, in which the precipitate is washed with dry carbon tetrachloride and is then vacuum dried.

12. The process of preparing a nitroform salt of alkyl aluminum, which comprises reacting aluminum trialkyl with nitroform, HC(NO₂)₃, in an inert diluent, and recovering the resulting solid nitroform salt of alkyl aluminum.

13. The process of preparing a nitroform salt of alkyl boron, which comprises reacting boron trialkyl with nitroform, HC(NO₂)₃, in an inert diluent and recovering a resultant solid salt of alkyl boron.

14. The process of preparing a nitroform salt of a metal selected from the group consisting of lithium, beryllium, boron, magnesium and aluminum, which comprises reacting bromotrinitromethane, BrC(NO₂)₃, with an organo-metallic compound of said metal in which the organo radical is an alkyl radical, and separating a resulting nitroform salt of the metal formed in an inert diluent.

References Cited

UNITED STATES PATENTS

| | | | |
|---|---|---|---|
| 2,977,381 | 3/1961 | Roha et al. | 260—448 |
| 2,875,224 | 2/1959 | Winkle et al. | 260—448 |
| 2,538,298 | 1/1951 | Denton et al. | 260—644 |
| 2,951,093 | 8/1960 | Anderson | 260—606.5 |
| 2,938,778 | 5/1960 | Linsh | 52—0.5 |
| 2,978,306 | 4/1961 | Mace | 52—0.5 |

LELAND A. SEBASTIAN, Primary Examiner

U.S. Cl. X.R.

149—19, 88; 260—606.5, 644